(12) United States Patent
Burtenshaw et al.

(10) Patent No.: US 10,262,030 B1
(45) Date of Patent: Apr. 16, 2019

(54) AUTOMATIC DYNAMIC REUSABLE DATA RECIPES

(71) Applicant: Domo, Inc., American Fork, UT (US)

(72) Inventors: Jeff Burtenshaw, West Jordan, UT (US); Daren Thayne, Orem, UT (US); Joshua G. James, Orem, UT (US); Paul Baker, Salt Lake City, UT (US)

(73) Assignee: DOMO, Inc., American Fork, UT (US)

( * ) Notice: Subject to any disclaimer, the term of this patent is extended or adjusted under 35 U.S.C. 154(b) by 55 days.

(21) Appl. No.: 14/257,669

(22) Filed: Apr. 21, 2014

Related U.S. Application Data

(60) Provisional application No. 61/814,586, filed on Apr. 22, 2013.

(51) Int. Cl.
   *G06F 17/30* (2006.01)

(52) U.S. Cl.
   CPC .. *G06F 17/30424* (2013.01); *G06F 17/30011* (2013.01); *G06F 17/30315* (2013.01); *G06F 17/30327* (2013.01); *G06F 17/30554* (2013.01); *G06F 17/30563* (2013.01); *G06F 17/30598* (2013.01); *G06F 17/30873* (2013.01)

(58) Field of Classification Search
   CPC ......... G06F 17/30345; G06F 17/30292; G06F 17/30557; G06F 17/30542; G06F 17/30864; G06F 17/30917; G06F 17/30569; G06F 17/30306; G06F 17/30604; G06F 17/30424; G06F 17/30598; G06F 17/30327; G06F 17/30554; G06F 17/30873; G06F 17/30315; G06F 17/30011; G06F 17/30563

See application file for complete search history.

(56) References Cited

U.S. PATENT DOCUMENTS

| | | | | |
|---|---|---|---|---|
| 6,975,910 | B1 * | 12/2005 | Brown | G06F 19/3475 700/90 |
| 7,127,469 | B2 * | 10/2006 | Lindblad | G06F 17/3071 |
| 7,171,404 | B2 * | 1/2007 | Lindblad | G06F 17/30911 |
| 7,962,476 | B2 * | 6/2011 | Kao | G06F 17/30498 707/716 |
| 7,962,512 | B1 * | 6/2011 | Sholtis | G06F 17/30566 707/777 |
| 2003/0217069 | A1 * | 11/2003 | Fagin | G06F 17/30569 |

(Continued)

OTHER PUBLICATIONS

Methods and systems for flexible and scalable databases, An IP.com prior art database technical disclosure, published Jun. 2012, pp. 1-26.*

*Primary Examiner* — Srirama Channavajjala
(74) *Attorney, Agent, or Firm* — Stoel Rives LLP

(57) ABSTRACT

A data recipe may be automatically generated to provide requested information to a user. After the information is requested, one or more data sources may be interrogated to discover a plurality of data types of data stored in the data sources. The data types may be categorized to define a plurality of data recipe ingredients that are likely to be needed to provide the requested information. The data recipe ingredients may be compared with a reference data recipe. Based on the results of the comparison, a new data recipe that provides the requested information may be made by either modifying the reference data recipe or by proceeding independently of the reference data recipe. The new data recipe may, for example, calculate a key performance indicator used to measure organizational performance.

32 Claims, 7 Drawing Sheets

(56) References Cited

U.S. PATENT DOCUMENTS

| | | | | |
|---|---|---|---|---|
| 2004/0122798 | A1* | 6/2004 | Lin | G06F 17/30466 |
| 2005/0149537 | A1* | 7/2005 | Balin | G06F 17/303 |
| 2005/0278352 | A1* | 12/2005 | Bradski | G06K 9/6215 |
| 2006/0041539 | A1* | 2/2006 | Matchett | G06F 17/30554 |
| 2007/0011175 | A1* | 1/2007 | Langseth | G06F 17/30563 |
| 2008/0091705 | A1* | 4/2008 | McBride | G06F 19/3475 |
| 2008/0140696 | A1* | 6/2008 | Mathuria | G06F 17/30315 |
| 2009/0033664 | A1* | 2/2009 | Hao | G06T 11/206 345/440 |
| 2009/0164933 | A1* | 6/2009 | Pederson | G05B 19/409 715/772 |
| 2009/0299926 | A1* | 12/2009 | Garrity | G06F 19/24 706/14 |
| 2010/0174976 | A1* | 7/2010 | Mansfield | G06F 17/211 715/234 |
| 2010/0325102 | A1* | 12/2010 | Maze | G06F 17/30011 707/722 |
| 2011/0055044 | A1* | 3/2011 | Wiedl | G06Q 30/02 705/26.5 |
| 2011/0119288 | A1* | 5/2011 | Sinha | G06F 17/30306 707/769 |
| 2011/0213783 | A1* | 9/2011 | Keith, Jr. | G06F 17/30873 707/741 |
| 2011/0295900 | A1* | 12/2011 | DeWoolfson | G06F 17/30604 707/792 |
| 2012/0253828 | A1* | 10/2012 | Bellacicco, Jr. | G06Q 30/0201 705/1.1 |
| 2012/0322032 | A1* | 12/2012 | Smith | G06Q 30/0633 434/127 |
| 2014/0149239 | A1* | 5/2014 | Argue | G06O 30/0631 705/21 |
| 2015/0032727 | A1* | 1/2015 | Chung | G06Q 30/0251 707/722 |
| 2015/0220603 | A1* | 8/2015 | Bhatt | G06F 17/277 707/722 |
| 2015/0379423 | A1* | 12/2015 | Dirac | G06N 99/005 706/12 |

* cited by examiner

AUTOMATIC DYNAMIC REUSABLE DATA RECIPES

CROSS-REFERENCE TO RELATED APPLICATION

The present application claims priority from U.S. Provisional Application Ser. No. 61/814,586 for "Automatic Dynamic Reusable Data Recipes," filed Apr. 22, 2013, which is incorporated by reference herein in its entirety.

FIELD OF THE INVENTION

The present invention relates to systems and methods for generating user-requested information, and more particularly, automated creation of data recipes.

DESCRIPTION OF THE RELATED ART

Many organizations possess vast troves of data, which may be stored in a variety of locations. Many aspects of organizational activity are often tracked and recorded. Nevertheless, despite the immense quantities of data available, many organizations find that they are unable to locate the information they currently need, particularly when multiple data sets must be combined to provide the information.

One example of this is the generation of key performance indicators, or KPI's, that provide metrics for assessing organizational performance. Many businesses use KPI's to make strategic decisions. Unfortunately, in many instances, when a new KPI is requested, considerable work must be done in order to obtain it. For example, a user may have to (1) determine what the component data of the KPI are, (2) determine where this data resides among one or more files, databases, and the like, (3) locate the data, (4) determine how the data should be combined in order to obtain the KPI, and (5) combine the data in the manner determined.

This can be exhaustive, particularly for a large organization in which the component data for the KPI are managed by multiple individuals. Hence, what may seem to be a simple request for information can be surprisingly difficult to fulfill. This problem may be compounded when, as is often the case, there is no standard format, nomenclature, or other metadata that can be used to automate the search for relevant data. The user must then engage in some analysis to determine where the desired data are likely to reside, how they are likely to be identified in the associated file and/or database. Hence, it is often prohibitively time consuming for an organization to find and use the data needed. Thus, tools that could be used to enhance the performance and strategic decision-making of the organization are simply not available.

Conventionally, data modeling is used to organize and structure data for efficient query and retrieval in various contexts. However, data modeling is typically a highly manual and expert-based task. Conventional data modeling methods may be expensive and labor-intensive, and may be unavailable to many organizations. Furthermore, many known data modeling techniques require significant computational time to resolve.

SUMMARY

As set forth above, locating, compiling, and processing data needed to provide a requested piece of information can be very difficult and time-consuming. The systems and methods of the present invention may address such difficulty by providing mechanisms for automatically creating a recipe to provide requested information. This may be done without the need for the user to review the associated data source or locate the constituent data.

Various embodiments of the present invention may implement dynamic reusable data recipes that allow a data structure to evolve automatically and dynamically over time as new content is added. Such content can be added for later access from a business semantic layer of a software application.

In at least one embodiment, the system may operate in contexts where high volumes of new content may be added and accessed/queried on a continual basis, so that the ability for a human data architect or team of data modelers would be overwhelmed by the volume and variety of structures required to be developed to support ever-changing needs.

In at least one embodiment, the system of the present invention may automatically create and evolve reusable data structures in real-time with little human intervention. One application of such a system is to enable and implement a community-based service that allows members to create new content and share that content with others. This can include, for example, extending existing content to cover new attributes and/or to answer new facets of questions.

In at least one embodiment, an interrogation engine, a categorization engine, and a comparison engine may be provided. These engines may, cooperatively, have the capability to evolve data recipes so as to optimize the reuse of existing data recipes and extend them as needed. In this manner, the systems and methods of the present invention may automate the process of generating data structures for efficient data storage and retrieval of query tools. Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

For illustrative purposes, the systems and methods described and depicted herein may refer to automated generation of data recipes that provide information requested by a user. The data recipes may, in some embodiments, relate to the operation of an enterprise. However, one skilled in the art will recognize that the techniques of the present invention can be applied to many different types of information, and may apply to many different situations apart from the exemplary enterprise operation context mentioned previously.

System Architecture

According to various embodiments, the present invention can be implemented on any electronic device(s) equipped to receive, store, and present information. Such an electronic device(s) may include, for example, one or more a desktop computers, laptop computers, smartphones, tablet computers, or the like.

Although the invention is described herein in connection with an implementation in a computer, one skilled in the art will recognize that the techniques of the present invention can be implemented in other contexts, and indeed in any suitable device capable of receiving and/or processing user input. Accordingly, the following description is intended to illustrate various embodiments of the invention by way of example, rather than to limit the scope of the claimed invention.

Figure 1A:
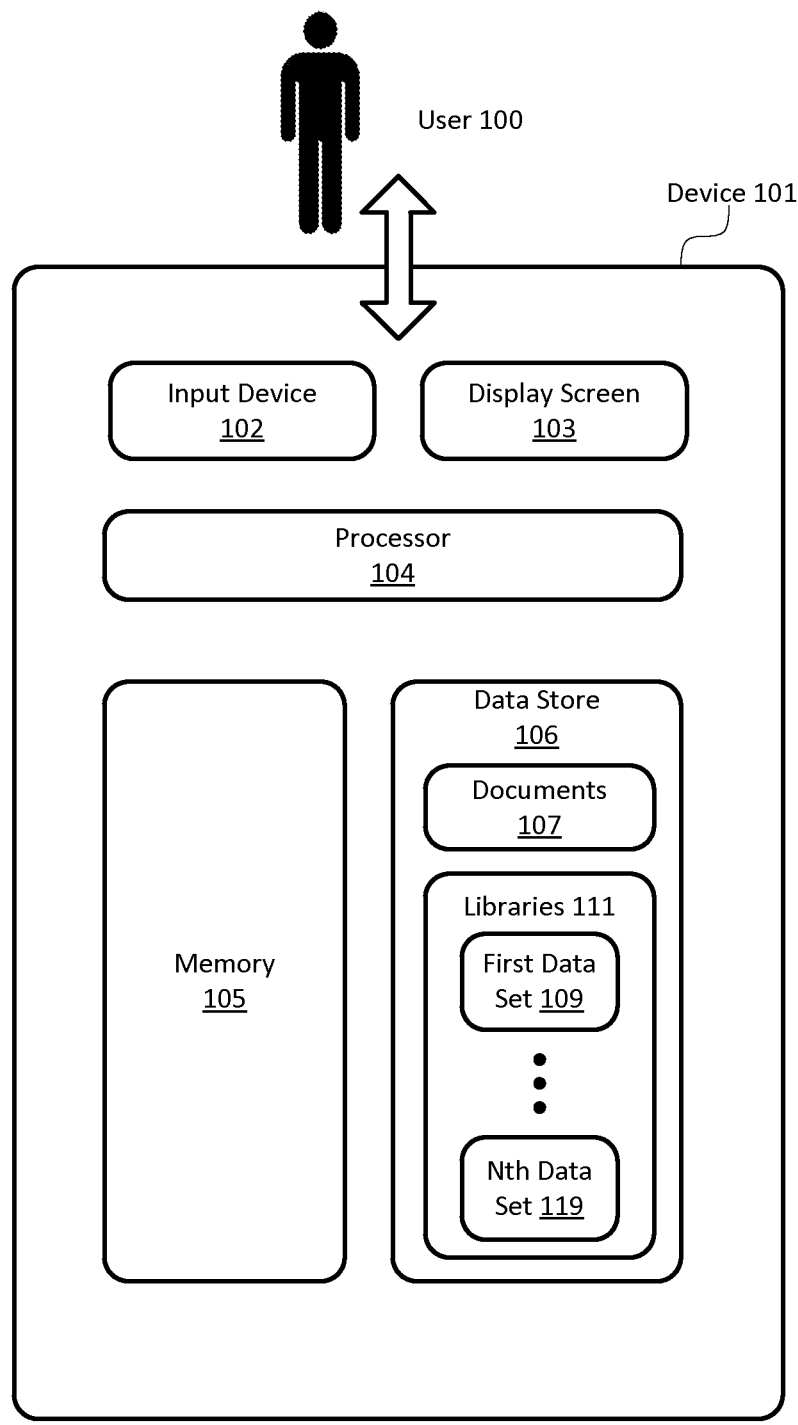
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and/or present information, and to receive user input in connect with such information.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may include documents 107 and/or libraries 111 that can be utilized and/or displayed according to the techniques of the present invention, as described below. In another embodiment, documents 107 and/or libraries 111 can be stored elsewhere, and retrieved by device 101 when needed for presentation to user 100. Libraries 111 may include one or more data sets, including a first data set 109, and optionally, a plurality of additional data sets up to an nth data set 119.

Display screen 103 can be any element that graphically displays documents 107, libraries 111, and/or the results of steps performed on documents 107 and/or libraries 111 to provide data output incident to automated provision of data recipes. Such data output may include, for example, one or more prompts that request information from the user 100, data, data visualizations, prompts requesting input to confirm and/or modify data recipes, and the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Documents 107 and/or libraries 111 can be entered from a source outside of device 101 into a data store 106 that is detachable, and later displayed after the data store 106 is connected to device 101. In another embodiment, data store 106 is fixed within device 101.

Figure 1B:
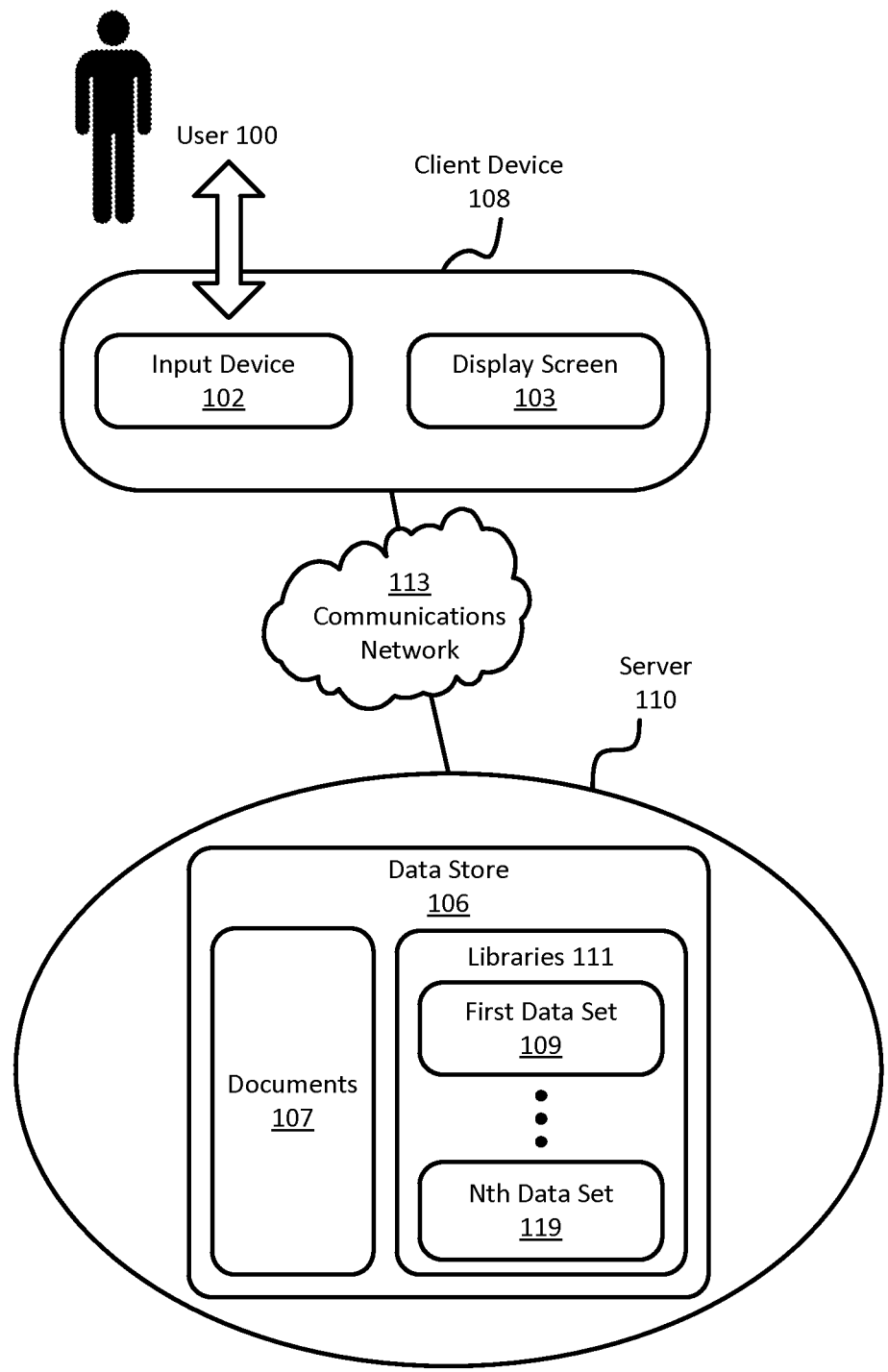
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Documents 107 and/or libraries 111 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, or the like. Any suitable type of communications network 113, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peerto-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 110 containing the requested data.

In this implementation, server 110 is responsible for data storage and processing, and incorporates data store 106 for storing documents 107 and/or libraries 111. Server 110 may include additional components as needed for retrieving data and/or libraries 111 from data store 106 in response to requests from client device 108.

In at least one embodiment, documents 107 are organized into one or more well-ordered data sets, with one or more data entries in each set. Data store 106, however, can have any suitable structure. Accordingly, the particular organization of documents 107 within data store 106 need not resemble the form in which documents 107 are displayed to user 100. In at least one embodiment, an identifying label is also stored along with each data entry, to be displayed along with each data entry.

The libraries 111 may include one or more data sources, which may be stored at one or more locations and in one or more formats. In at least one embodiment, libraries 111 are organized in a file system within data store 106. Appropriate indexing can be provided to associate particular documents with particular quantitative data elements, reports, other documents, and/or the like. Libraries 111 may include any of a wide variety of data structures known in the database arts. As in FIG. 1A, libraries 111 may include one or more data sets, including a first data set 109, and optionally, a plurality of additional data sets up to an nth data set 119.

Documents 107 and/or libraries 111 can be retrieved from client-based or server-based data store 106, and/or from any other source. In at least one embodiment, input device 102 is configured to receive data entries from user 100, to be added to documents 107 and/or libraries 111 held in data store 106. User 100 may provide such data entries via the hardware and software components described above according to means that are well known to those skilled in the art.

Display screen 103 can be any element that graphically displays documents 107, libraries 111, and/or the results of steps performed on documents 107 and/or libraries 111 to provide data output incident to automated provision of data recipes. Such data output may include, for example, one or more prompts that request information from the user 100, data, data visualizations, prompts requesting input to confirm and/or modify data recipes, and the like. In at least one embodiment where only some of the desired output is presented at a time, a dynamic control, such as a scrolling mechanism, may be available via input device 102 to change which information is currently displayed, and/or to alter the manner in which the information is displayed.

In at least one embodiment, the information displayed on display screen 103 may include data in text and/or graphical form. Such data may comprise visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Furthermore, as described in more detail below, display screen 103 can selectively present a wide variety of data related to automated data recipe generation. In particular, as described herein, user 100 can provide input, such as a selection from a menu containing a variety of options, to determine the various characteristics of the information presented such as the type, scope, and/or format of the information to be displayed on display screen 103.

In one embodiment, the system can be implemented as software written in any suitable computer programming language, whether in a standalone or client/server architecture. Alternatively, it may be implemented and/or embedded in hardware.

Data Recipe, Data Map, and Semantic Layer Structure

In general, a "data recipe" may include any instruction set that enables requested information to be obtained from other data in one or more data sources. A wide variety of data types and processes may be included in a data recipe. Each piece of data used by the data recipe (i.e., each "data recipe ingredient") may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer.

Figure 2:
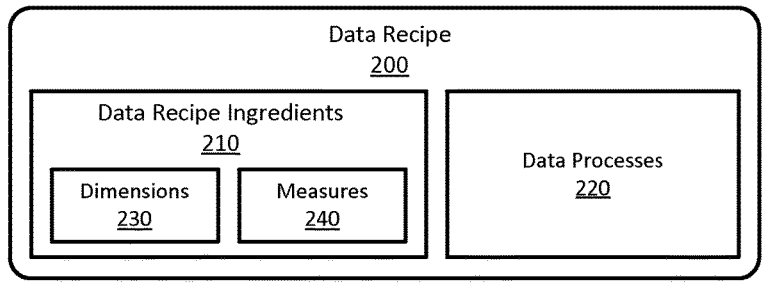
FIG. 2 is a block diagram depicting the structure of a data recipe according to one embodiment of the present invention.

Referring to FIG. 2, a block diagram depicts the structure of a data recipe 200 according to one embodiment of the present invention. The data recipe 200 may include one or more data recipe ingredients 210 and one or more data processes 220 that describe how the data recipe ingredients 210 are to be combined and/or manipulated to obtain the requested information. Thus, the data recipe ingredients 210 may include data of any of the types listed in the preceding paragraph, and the data processes 220 may include one or more formulas or other combination instructions indicating how the data recipe ingredients 210 may be used to obtain the requested information. If the data recipe ingredients 210 include numbers, the data processes 220 may include mathematical formulas or the like.

The data recipe ingredients 210 may include one or more dimensions 230 and/or one or more measures 240. In general, a measure 240 is a property on which calculations can be made, while a dimension 230 is a data set that can be used for structured labeling of measures. For example, dimensions 230 may represent data that would likely be used as the scale on a data visualization, such as the X-axis on a conventional bar chart or line chart. The measures 240 may represent data that would likely be used for the measurements on a data visualization, such as the vertical displacements of the bars or points of a conventional bar chart or line chart.

According to one example, a set of rules may be used to define which of the data recipe ingredients 210 are dimensions 230 and which are measures 240. One example of such a set of rules is as follows:

- Any of the data recipe ingredients 210 that represent dates may be classified as dimensions 230.
- Any of the data recipe ingredients 210 that do not represent dates but are alpha-numeric may also be classified as dimensions 230.
- Any of the data recipe ingredients 210 that are numeric and do not have a name that includes "ID," "type," "group," "category," or a similar descriptor may be measures 240.
- Any of the data recipe ingredients 210 that are numeric and do not have less than a number of distinct values, such as twenty distinct values may be measures 240.

Such a rule set may grow in sophistication over time. In at least one embodiment, machine learning techniques and/or other techniques may be used to automatically grow, refine, and/or otherwise develop the rule set used to classify the data recipe ingredients 210 as dimensions 230 or measures 240. In alternative embodiments, the dimensions 230 and the measures 240 may be defined according to a wide variety of alternative definitions or rules, or alternatively, other classifications (or no classifications) may be applied to the data recipe ingredients 210.

Figure 3:
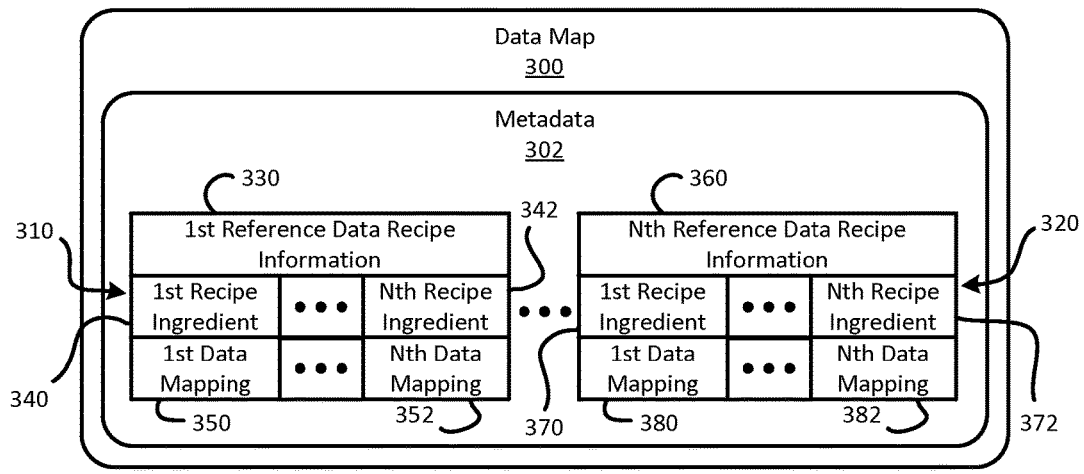
FIG. 3 is a block diagram depicting the structure of a data map according to one embodiment of the present invention.

Referring to FIG. 3, a block diagram depicts the structure of a data map 300 according to one embodiment of the present invention. The data map 300 may be designed to identify the data recipe ingredients 210 within one or more data stores 106.

As shown, the data map 300 may include metadata 302, which may include records for one or more reference data recipes that are to be mapped to data sources such as the data store 106. More specifically, the metadata 302 may include a first record 310 pertaining to a first reference data recipe and optionally, one or more additional records pertaining to one or more additional reference data recipes up to an nth record 320 pertaining to an nth reference data recipe.

The first record 310 may include first reference data recipe information 330 pertaining to the first reference data recipe. The first reference data recipe information 330 may include a name or other indicator of the first reference data recipe, the information the first reference data recipe is designed to provide, data processes 220 associated with the first reference data recipe, or the like.

Additionally, the first record 310 may include the data recipe ingredients 210 of the first reference data recipe, which may include a first data recipe ingredient 340 and optionally, one or more additional data recipe ingredients up to an nth data recipe ingredient 342. For each of the data recipe ingredients 210 of the first reference data recipe, the metadata 302 may contain a mapping indicating where the data of each data recipe ingredient 210 can be found in one or more data stores 106.

More specifically, the metadata 302 may also contain, for each of the data recipe ingredients 210 of the first reference data recipe, a data mapping including a first data mapping 350 for the first data recipe ingredient 340 and optionally, one or more additional data mappings up to an nth data mapping 352 for the nth data recipe ingredient 342. The first data mapping 350 may indicate the location of the first data recipe ingredient 340 in one or more data stores 106. Similarly, the nth data mapping 352 may indicate the location of the nth data recipe ingredient 342 in one or more data stores 106.

Similarly, the nth record 320 may include nth reference data recipe information 360 pertaining to the nth reference data recipe. The nth reference data recipe information 360 may include a name or other indicator of the nth reference data recipe, the information the nth reference data recipe is designed to provide, data processes 220 associated with the nth reference data recipe, or the like.

Additionally, the nth record 320 may include the data recipe ingredients 210 of the nth reference data recipe, which may include a first data recipe ingredient 370 and optionally, one or more additional data recipe ingredients up to an nth data recipe ingredient 372. For each of the data recipe ingredients 210 of the nth reference data recipe, the metadata 302 may contain a mapping indicating where the data of each data recipe ingredient 210 can be found in one or more data stores 106.

More specifically, the metadata 302 may also contain, for each of the data recipe ingredients 210 of the nth data recipe, a data mapping including a first data mapping 380 for the first data recipe ingredient 370 and optionally, one or more additional data mappings up to an nth data mapping 382 for the nth data recipe ingredient 372. The first data mapping 380 may indicate the location of the first data recipe ingredient 370 in one or more data stores 106. Similarly, the nth data mapping 382 may indicate the location of the nth data recipe ingredient 372 in one or more data stores 106.

Figure 4:
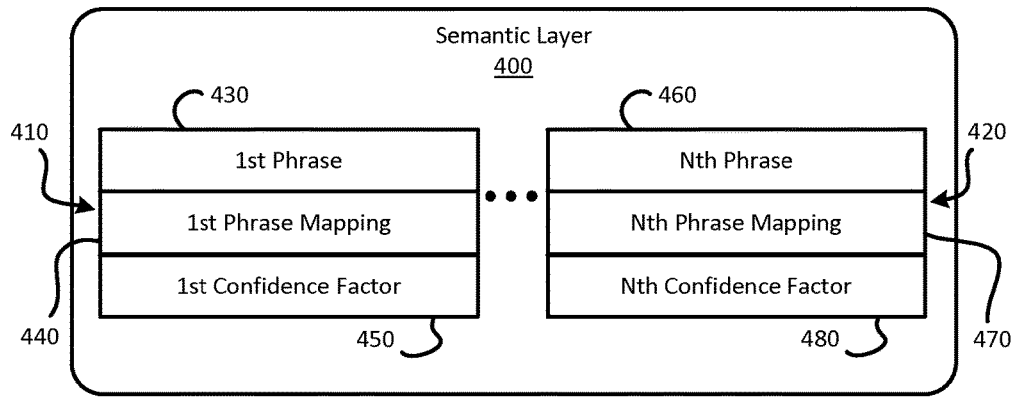
FIG. 4 is a block diagram depicting the structure of a semantic layer according to one embodiment of the invention.

Referring to FIG. 4, a block diagram depicts the structure of a semantic layer 400 according to one embodiment of the invention. The semantic layer 400 may provide pairings between terminology and data to facilitate location of data with a semantic identification, such as a name, description, other semantic metadata, or the like, within one or more data stores 106. The semantic layer 400 may link a "phrase," which may include one or more words or other semantic elements, with the location within one or more data stores 106, where data corresponding to that phrase may be found.

As shown, the semantic layer 400 may have one or more pairings, which may include a first pairing 410 and optionally, one or more additional pairings up to an nth pairing 420. The first pairing 410 may include a first phrase 430 and a first phrase mapping 440, which may indicate one or more locations within one or more data stores 106 where the first phrase 430, or data corresponding to the first phrase 430, may be found.

The first pairing 410 may further include a first confidence factor 450 indicating a level of confidence in the link between the first phrase 430 and the first phrase mapping 440. The first confidence factor 450 may, for example, be a number such as a percentage, where 0% indicates no confidence in the link, and 100% indicates absolute certainty that the first phrase mapping 440 is the location of the first phrase 430, or data related to the first phrase 430, within one or more data stores 106. This structure may facilitate machine learning to allow for improved performance in generating and developing data recipes over time. The first confidence factor 450 may be revised over time based on user feedback, further comparisons with the data store 106, or the like.

Similarly, the nth pairing 420 may include an nth phrase 460 and an nth phrase mapping 470, which may indicate one or more locations within one or more data stores 106 where the nth phrase 460, or data corresponding to the nth phrase 460, may be found.

The nth pairing 420 may further include an nth confidence factor 480 indicating a level of confidence in the link between the nth phrase 460 and the nth phrase mapping 470. Like the first confidence factor 450, the nth confidence factor 480 may be a number or other indicator of a confidence level that the first phrase mapping 440 is the location of the first phrase 430, or data related to the first phrase 430, within one or more data stores 106. The nth confidence factor 480 may also be revised over time based on user feedback, further comparisons with the data store 106, or the like.

If desired, the semantic layer 400 may be incorporated into the data map 300. Alternatively, the semantic layer 400 may be independent of the data map 300.

Conceptual Architecture

In at least one embodiment, the system of the present invention enables automated provision of data recipes for generating, collecting, and/or presenting information requested by users. A data recipe may be formulated by interrogating one or more data sources, such as the data store 106, to obtain data types categorizing the data types into data recipe ingredients, and comparing the data recipe ingredients with one or more reference data recipes. The new data recipe may then be created independently, or by modifying one or more reference data recipes to obtain the new data recipe. The new data recipe may then be used to generate, collect, and/or present the requested information.

Figure 5:
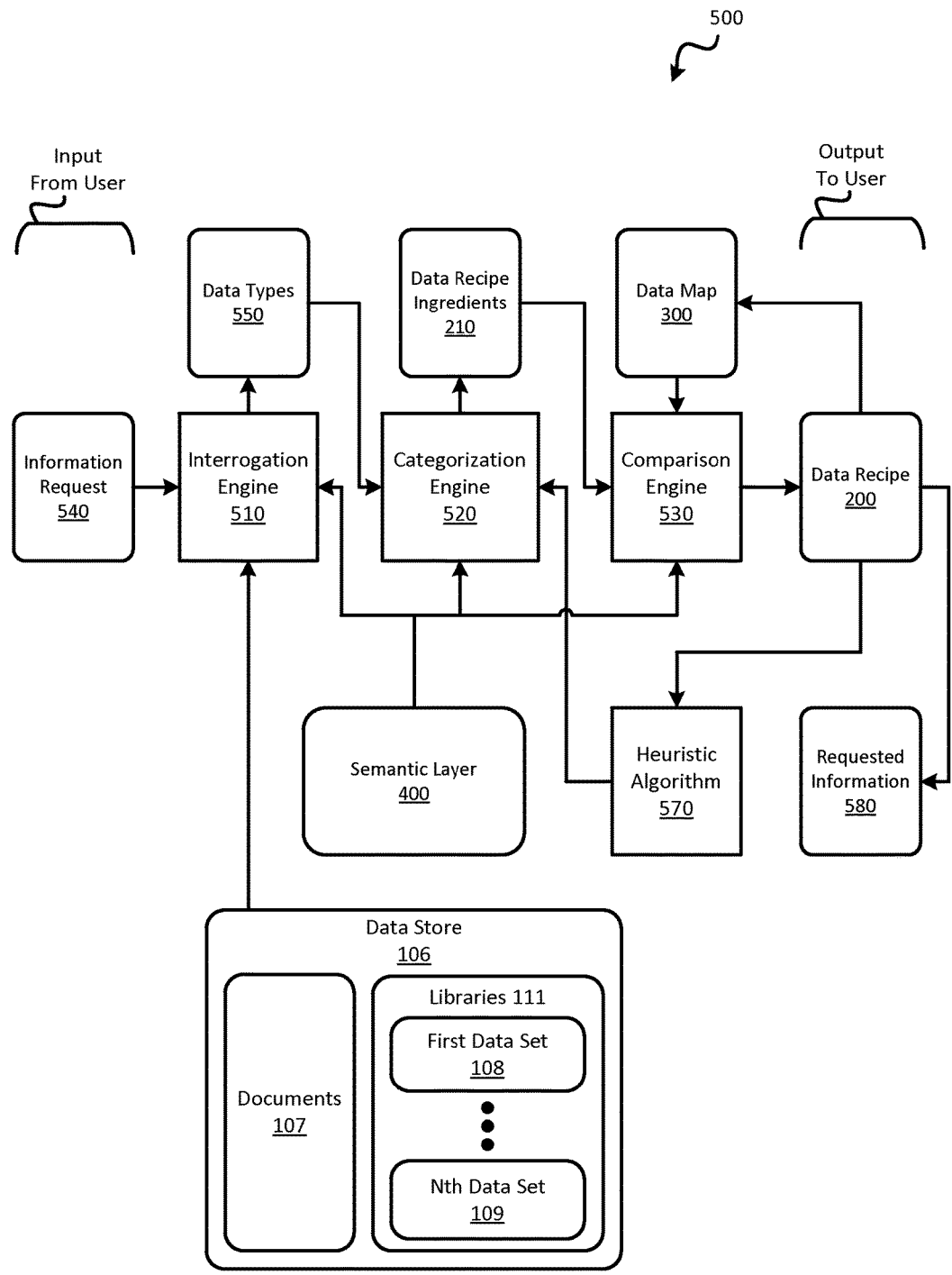
FIG. 5 is a block diagram depicting a system for carrying out automatic information provision, according to one embodiment of the present invention.

Referring to FIG. 5, a block diagram depicts a system 500 for carrying out automatic data recipe generation, according to one embodiment of the present invention. As shown, the system 500 may have an interrogation engine 510, a categorization engine 520, and a comparison engine 530 that may cooperate to generate a data recipe 200. User inputs are shown on the left-hand side of FIG. 5, and outputs to the user are shown on the right-hand side of FIG. 5.

As shown, the system 500 may receive an information request 540 from the user 100. The information request 540 may indicate one or more pieces of information desired by the user 100. The information request 540 may be for any type of information. The information request 540 may be provided via the input device 102, and may include one or more numbers, phrases, natural language questions, menu selections, and/or a variety of other user input elements.

In some embodiments, the system 500 may be incorporated into a business intelligence system. The information request 540 may relate to organizational performance, and may more specifically be a key performance indicator (KPI).

Key performance indicators are performance measurement indicators that can be used to evaluate success of an enterprise, e.g., an entity, activity, organization, or group. KPI reports, which summarize key performance indicators, can be very useful in management of an enterprise so that effective decisions can be made regarding business strategy and resource allocation. KPIs can be compiled to create a "dashboard," which is a compiled snapshot of the most important aspects of the operation of the enterprise.

Generally, KPIs are numerically measurable aspects of the operation of an enterprise. Some KPIs are well-known and apply to a wide range of businesses. However, the most important KPIs for a business are often highly industry-specific, enterprise-specific, or even department-specific. In management, the challenge is to know which KPIs to focus on. Often, the process of finding the best KPIs to use is an iterative one in which one set of KPI's is utilized, and then refreshed to add and/or remove KPIs to the set under review. The speed at which this process occurs is often limited by the ability of an organization to locate and/or process the data required to calculate the KPIs of interest.

Thus, if the information request 540 is for a KPI, the system 500 may beneficially provide the user with a data recipe 200 that can be used to locate and properly process the data necessary to obtain the KPI. This may be performed in several stages.

In at least one embodiment, the system 500 of the present invention may apply a sophisticated set of heuristics within a software application. The interrogation engine 510, the categorization engine 520, and/or the comparison engine 530 may utilize a heuristic algorithm 570 to perform any of a number of tasks including, but not limited to creation and/or implementation of the data map 300 and/or the semantic layer 400. FIG. 5 illustrates a connection between the heuristic algorithm 570 and the categorization engine 520, but the interrogation engine 510 and/or the comparison engine 530 may also utilize the heuristic algorithm 570, if desired.

The information request 540 may be received by the interrogation engine 510. The interrogation engine 510 may interrogate one or more data sources, which are exemplified by the data store 106 in FIG. 5. The interrogation engine 510 may identify data types 550 present within the data store 106. This may optionally be done with the aid of the semantic layer 400, which may help to map semantic elements of the information request 540 and/or the data types 550 to corresponding data within the data store 106. Data interrogation may be done based on semantics so that the data types 550 will conform to semantic archetypes. Alternatively, the interrogation engine 510 may function independently of the semantic layer 400.

In at least one embodiment, the interrogation engine 510 may receive data from the data store 106 and parse the data into a NoSQL tree structure for processing. If desired or necessary, the schema of the NoSQL tree structure can be approximated based on the structure of the data store 106.

The data types 550 may be provided to the categorization engine 520, which may categorize the data types 550 to determine which of the data types 550 are data recipe ingredients 210 of the data recipe 200 to be created. Like the interrogation engine 510, the categorization engine 520 may operate with the aid of the semantic layer 400, or independently of the semantic layer 400.

The categorization engine 520 may function by, for example, using the heuristic algorithm 570 to identify the dimensions 230 and/or measure 240 of the data. Relationships between data elements within the schema may be inferred from the structure of the data store 106, if possible. This may be accomplished, for example, by interrogating the data store 106 to find ingredients in common among different entities.

The data recipe ingredients 210 may be provided to the comparison engine 530, which may compare the data recipe ingredients 210 with one or more reference data recipes to determine whether one or more of the reference data recipes can be modified to yield the data recipe 200 that provides the requested information. The reference data recipes may be stored in the data map 300, for example, in the first reference data recipe information 330 through the nth reference data recipe information 360. Thus, the comparison engine 530 may compare the data recipe ingredients 210 with the data map 300, or more precisely, with the data recipe ingredients stored within the data map 300. This may entail comparing the data recipe ingredients 210 with the first data recipe ingredient 340 through the nth data recipe ingredient 342 and the data recipe ingredients of the other data recipes, up to the first data recipe ingredient 370 through the nth data recipe ingredient 372.

The determination of whether to modify one of the reference data recipes stored in the data map 300 may be made, for example, based on the degree of similarity between the data recipe ingredients 210 for the data recipe 200 desired, and the data recipe ingredients 210 of the corresponding reference data recipe. Thus, for example, if the data recipe ingredients 210 received by the comparison engine 530 are very similar to the first data recipe ingredient 340 through the nth data recipe ingredient 342 of the first record 310 of the data map 300, it may be easier to modify the corresponding first reference data recipe to obtain the data recipe 200 that satisfies the information request 540. Conversely, if none of the reference data recipes stored in the data map 300 have data recipe ingredients 210 that are similar to the data recipe ingredients 210 received from the categorization engine 520, the data recipe 200 may be created independently of any of the reference data recipes.

Like the interrogation engine 510 and the categorization engine 520, the categorization engine 520 may operate with the aid of the semantic layer 400, or independently of the semantic layer 400. In one example, the comparison engine 530 may use the heuristic algorithm 570 to attempt to match each element in the schema to the semantic layer 400 based, for example, on name, data type, sample data set, and/or any other suitable data elements.

In at least one embodiment, the comparison engine 530 may use the data map 300. As set forth previously, the data map 300 may describe one or more reference data recipes, such as the first through nth reference data recipes of FIG. 3, and may describe how each reference data recipe correlates to the data store 106. In this manner, the comparison engine 530 may determine how a data recipe can be applied to a different data source, used to power a data visualization, or otherwise used in a manner different from that of its reference data recipe.

If desired, comparison of the data recipe ingredients 210 received from the categorization engine 520 with those of the reference data recipes of the data map 300 may be made by comparing attributes of elements of the data recipe ingredients 210 with corresponding attributes of the reference data recipes. The following is an exemplary list of attributes that can be associated with one another in accordance with the techniques of the present invention:

- A name of the element;
- A data type of the element;
- A display name of the element;
- An alias or tag name of the element, which may yield more commonalties for automated data recipe creation than elements such as the source column name;
- A metadata tag associated with the element;
- An average size of data of the element;
- A level of uniformity of the element, which may, for example, be calculated as the number of distinct data points within the data divided by the total number of data points within the data;
- A cleanliness level of the element, which may be determined, for example, by:
  - A presence and/or prevalence of NULLs in relationship keys;
  - A presence and/or prevalence of malformed data based on assumed data types; and/or
  - A presence and/or prevalence of multiple variations of a standard data point;
- An anticipated relationship between the element and other data, which may be determined by, for example:
  - Groupings via many-to-many tag structures (related measures may share related tags)
  - Relationships to possible dimensions (which may include percentages of probable matches or the like)

The foregoing is merely exemplary; the comparison engine 530 may utilize any of a wide variety of data comparison techniques known in the art. In at least one embodiment, the system 500 may gather feedback from the user 100 at one or more points in the process via direct interaction (prompt and response) and/or by monitoring manual adjustments to generated content (changes in the state of the model). In one embodiment, the system 500 may provide the data recipe 200 to the user for approval or rejection. If the user 100 rejects the data recipe 200, the data recipe 200 may be revised, for example, by further iterations with the interrogation engine 510, the categorization engine 520, and/or the comparison engine 530.

Once the data recipe 200 has been provided to the satisfaction of the user 100, it may be used to adjust the heuristic algorithm 570 through the use of machine learning or other techniques. The data recipe 200 may also be added to the data map 300 as one of the reference data recipes that may be modified in the process of generating future data recipes.

Additionally or alternatively, the semantic layer 400 may also be adjusted as the system 500 operates. These adjustments to the semantic layer 400 may be made based upon user feedback, or through the use of machine learning techniques or the like. Such changes to the semantic layer 400 may then be fed back through the system 500 to re-evaluate previously applied schema and thereby improve the performance of the system 500 for future data recipe generation.

If desired, the data recipe 200 may be provided to the user 100. The user 100 may then use the data recipe 200 to fulfill the information request 540. The data recipe 200 may be used repeatedly to obtain the requested information 580 as circumstances change. For example, if the information request 540 represents a KPI, the data recipe 200 may be used to obtain the KPI and then update and/or review it according to an interval desired by the user 100.

Additionally or alternatively, the system 500 may also be designed to apply the data recipe 200 to fulfill the information request 540 by providing the requested information 580 automatically for the user 100. The system 500 may do this only once, or at any interval desired by the user 100. If desired, the system 500 may provide the user 100 with the requested information 580 and then receive feedback based on the requested information 580. For example, returning to the example of a KPI, if the user deems that the requested information 580 is not the KPI that was requested, the user 100 may provide feedback that causes the system 500 to revise the data recipe 200 to obtain the requested information 580 again from the new data recipe.

Additionally or alternatively, after approval of the new data recipe 200, the new data recipe 200 may be further refined as needed. This may be done, for example, by additional iterations through the interrogation engine 510, the categorization engine 520, the comparison engine 530, and/or the heuristic algorithm 570.

Automatic Data Recipe Generation

Figure 6:
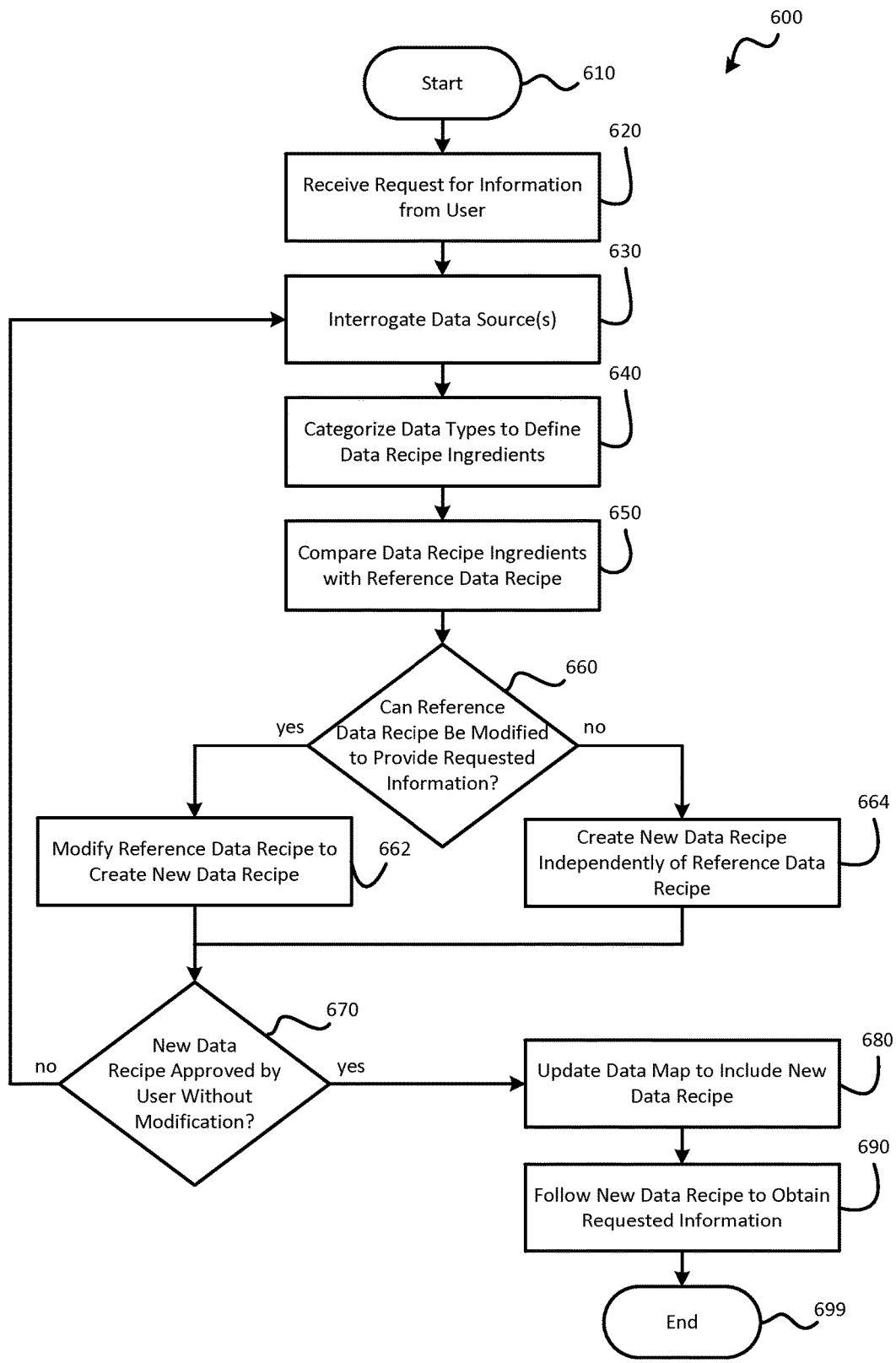
FIG. 6 is a flowchart depicting a method of carrying out automatic data recipe generation, according to one embodiment of the present invention.

Referring to FIG. 6, a flowchart depicts a method 600 of carrying out automatic data recipe generation, according to one embodiment of the present invention. The method 600 may be carried out, at least in part, by the system 500 as in FIG. 5, or with a differently-configured data recipe provision system. The method 600 may be performed in connection with input from the user 100; such a user 100 may be a developer, customer, enterprise leader, sales representative for business intelligence services, or any other individual. FIG. 6 illustrates a series of steps in a certain order, but those of skill in the art will recognize that these steps may be re-ordered, omitted, replaced with other steps, or supplemented with additional steps, consistent with the spirit of the invention.

The method 600 may utilize any suitable source of data, such as for example a spreadsheet, database, website, blog, whitepaper, report, key performance indicator (KPI), dashboard, and/or the like, which may provide the data store 106 illustrated in FIG. 5. It may then apply a rules-based algorithm to the data store 106 to interrogate the data store 106, discover the data types contained, categorize the data types into logical data recipe ingredients, compare the data recipe ingredients to existing reference data recipes, and either extend the existing reference data recipes as needed or create a new data recipe.

The method 600 may start 610 with a step 620 in which the information request 540 is received from the user 100. As mentioned in connection with FIG. 5, this may be done in many ways and with any of a wide variety of input devices 102.

Then in a step 630, the interrogation engine 510 may interrogate the data store 106, which may represent one or more data sources and may include any of a variety of data storage devices and/or schema. The step 630 may include interrogation of the data store 106 based on the information request 540 to provide the data types 550 stored within the data store 106. As set forth in the discussion of FIG. 5, the interrogation engine 510 may receive data from the data store 106, and may use the semantic layer 400 to assist with interrogation. The data map 300 and/or the heuristic algorithm 570 may additionally or alternatively be referenced by the interrogation engine 510 in the performance of the step 630.

Then, in a step 640, the categorization engine 520 may categorize the data types 550 from the data store 106, as provided by the interrogation engine 510, to define the data recipe ingredients 210 that may be components of the data recipe 200 that is to be generated to satisfy the information request 540. As mentioned in the description of FIG. 5, performance of the step 640 may entail usage of the semantic layer 400, the heuristic algorithm 570, and/or the data map 300. The data recipe ingredients 210 may be the actual and only data recipe ingredients 210 of the data recipe 200 that satisfies the information request 540, or they may be over-inclusive (i.e., including more data recipe ingredients 210 than the data recipe 200 will need), or may even be under-inclusive in the event that one or more steps of the method 600, including the step 640, are to be performed recursively to supply additional data recipe ingredients 210.

The method 600 may then proceed to a step 650, in which the only data recipe ingredients 210 received from the step 640 are compared by the comparison engine 530 with reference data recipes. As set forth in the discussion of FIG. 5, this may entail comparison of the only data recipe ingredients 210 received from the categorization engine 520 with those stored within the data map 300. As indicated in the description of FIG. 5, performance of the step 650 may entail usage of the semantic layer 400, the heuristic algorithm 570, and/or the data map 300.

Then, in a query 660, the system 500 may determine whether one of the reference data recipes can be modified to create the data recipe 200 that will satisfy the information request 540. Notably, it may be possible to create any data recipe 200 as a modification of one or more data recipes if enough modification is done. Thus, the query 660 may compare the likelihood of success and/or computational time required to modify one or more of the reference data recipes, with the likelihood of success and/or computational time required if the data recipe 200 is to be created independently of the reference data recipes.

If one or more reference data recipes are to be modified, the method 600 may progress to a step 662 in which the data recipe 200 that satisfies the information request 540 is created by modifying the one or more reference data recipes. Conversely, if the data recipe 200 that satisfies the information request 540 is to be created "from scratch," the method 600 may progress to a step 664 in which the data recipe 200 is created independently of the reference data recipes.

In either case, the result is the creation of a new data recipe 200. This data recipe 200 may optionally be presented to the user 100 for approval and/or modification. A query 670 may determine whether the user 100 approves the new data recipe 200 without modification. If the user 100 does not approve the data recipe 200, or provides modifications, either via explicit or implicit user feedback, the data recipe 200 may return to the step 630 and once again query the data store 106 for data types.

The step 630, the step 640, and/or the step 650 may again be performed, but if desired, may incorporate the feedback provided by the user 100. If no user feedback has been obtained, settings applicable to the step 630, the step 640, and/or the step 650 may be modified so that the resulting data recipe 200 is different from that obtained previously. For example, the data map 300, the semantic layer 400, and/or the heuristic algorithm 570 may operate on different settings from those used to obtain the data recipe 200 rejected by the user 100.

If the user 100 approves the data recipe 200 generated by the step 650 without modification, the method 600 may proceed to a step 680 in which the data map 300 is updated to include the data recipe 200. The data recipe 200 may be recorded in the data map 300 as one of the reference data recipes that can be the basis of comparison for future iterations of the step 650, and may be modified to obtain a new data recipe 200. If desired, the semantic layer 400 and/or the heuristic algorithm 570 may also be updated to reflect the data recipe 200 and/or any adjustments needed. Such adjustments may be made pursuant to known artificial intelligence and/or machine learning techniques based on the results of previous steps and/or queries of the method 600.

The data recipe 200 may then be provided to the user 100. As mentioned previously, the user 100 may use the data recipe 200, one time or repeatedly, to obtain the requested information 580. Additionally or alternatively, the method 600 may proceed to a step 690 in which the system 500 follows the data recipe 200 to obtain the requested information 580 and provide the requested information 580 to the user 100. This may also be done one time or repeatedly as desired by the user 100. The method 600 may then end 699.

EXAMPLE

A wide variety of methods may be used to generate a wide range of data recipes according to the invention. The following example is presented by way of illustration and not limitation to indicate some of the ways in which a system, such as the system 500 of FIG. 5, may be used to automatically generate a data recipe that provides information requested by a user through the use of a method such as the method 600 of FIG. 6.

Figure 7:
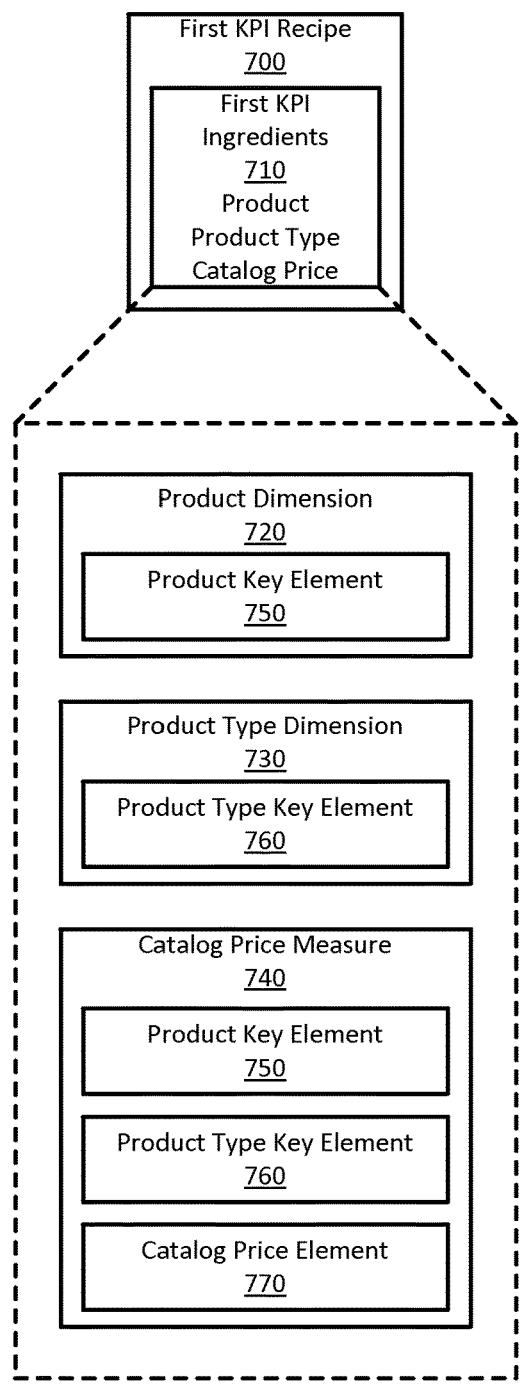
FIG. 7 is a block diagram depicting a first recipe used to obtain a first KPI according to one embodiment of the invention.

Referring to FIG. 7, a block diagram depicts a first KPI recipe 700 used to obtain a first KPI according to one embodiment of the invention. The first KPI may include products sold by a company broken down into product type and catalog price.

The first KPI recipe 700 may include first KPI ingredients 710, which may include product, product type, and catalog price ingredients. More precisely, as illustrated in the breakout of FIG. 7, the first KPI ingredients 710 may include one or more dimensions 230 and/or one or more measures 240, such as a product dimension 720, a product type dimension 730, and a catalog price measure 740. The determination of whether each of the first KPI ingredients 710 is a dimension or a measure may be made, for example, using the criteria set forth in the description of FIG. 2.

As shown, the product dimension 720 may have a product key element 750. The product type dimension 730 may have a product type key element 760. Since it is a measure 240, the catalog price measure 740 may include the product key element 750, the product type key element 760, and a catalog price element 770.

The first KPI recipe 700 may be generated by following the method 600 of FIG. 6, and/or utilizing the system 500 of FIG. 5. Thus, after the user 100 submits the information request 540 for the first KPI, the first KPI recipe 700 may be obtained by receiving and interrogating one or more data sources such as the data store 106. The interrogation engine 510, the categorization engine 520, and/or the comparison engine 530 may operate with the aid of the data map 300, the semantic layer 400, and/or the heuristic algorithm 570 to provide a proposed model, or a proposed data recipe, to the user 100.

The proposed data recipe may have any number of dimensions 230. In the example of FIG. 7, the first KPI ingredients 710 include the product dimension 720 and the product type dimension 730. If desired, the proposed data recipe may be presented to the user 100, and the user 100 may be prompted to accept or reject the proposed data recipe. If accepted, the proposed data recipe provided to the user 100, used to satisfy the information request 540 by providing the requested information 580, and/or further processed, for example, by the heuristic algorithm 570 for further refinement as additional data is received.

Figure 8:
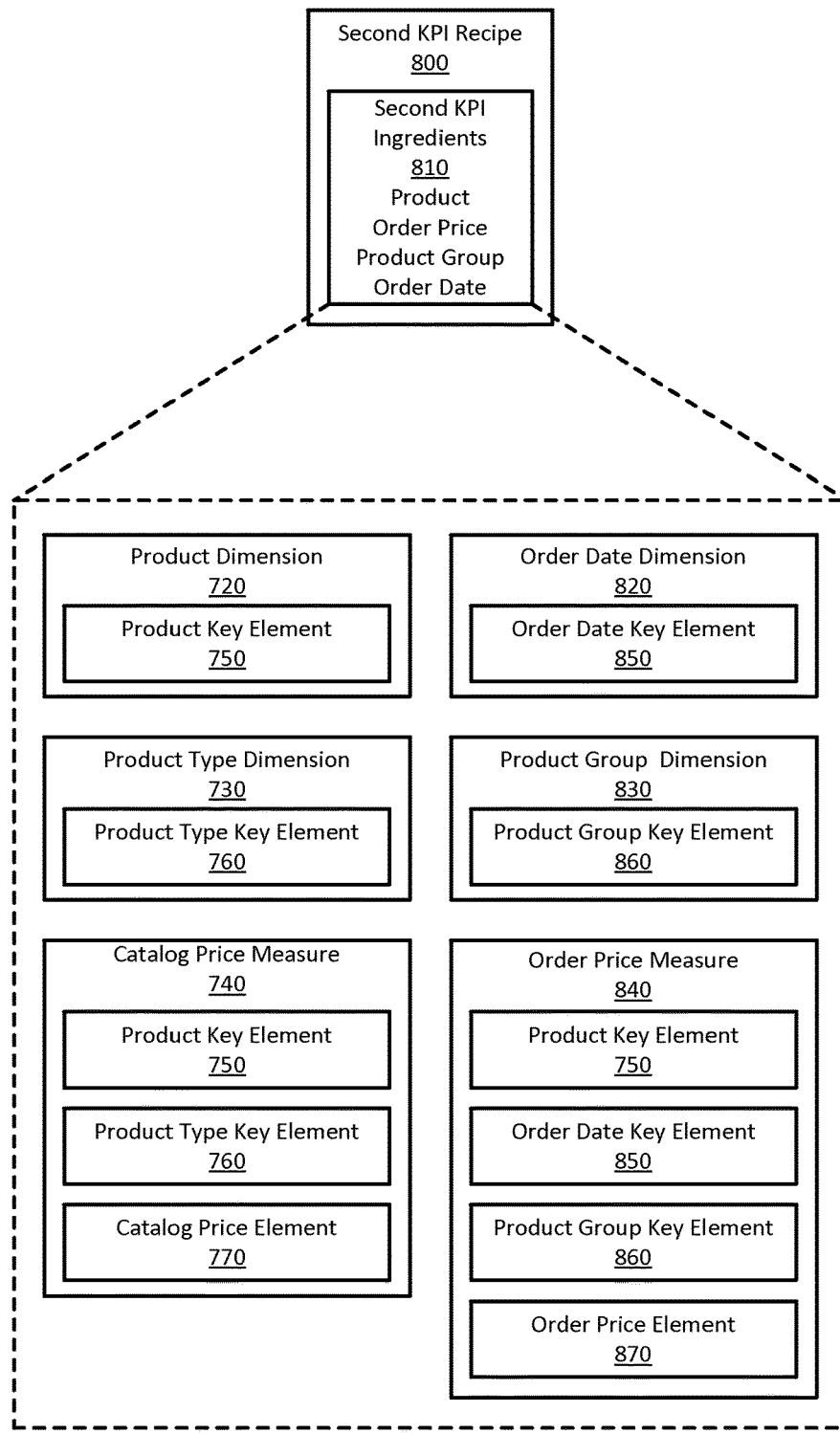
FIG. 8 is a block diagram depicting a second recipe used to obtain a second KPI according to one embodiment of the invention.

Referring to FIG. 8, a block diagram depicts a second KPI recipe 800 used to obtain a second KPI according to one embodiment of the invention. As shown, the second KPI may include products sold by a company broken down into product group, order price, and order date. The second KPI may relate to the same product as the first KPI.

The second KPI recipe 800 may include second KPI ingredients 810, which may include product, order price, product group, and order date ingredients. The breakout of FIG. 8 illustrates the pool of data recipe ingredients 210 from which the second KPI ingredients 810 may be selected. The first KPI ingredients 710 may be included in the pool and may be used to provide one or more of the second KPI ingredients 810. Thus, the first KPI recipe 700 may be modified to facilitate the creation of the second KPI recipe 800.

Like the first KPI ingredients 710, the second KPI ingredients 810 may include one or more dimensions 230 and/or one or more measures 240, one or more of which may be obtained from or derived from the first KPI ingredients 710 of the first KPI recipe 700. More specifically, the second KPI ingredients 810 may include the product dimension 720 from the first KPI ingredients 710. Additionally, the second KPI ingredients 810 may include an order date dimension 820, a product group dimension 830, and an order price measure 840.

As shown, the order date dimension 820 may have an order date key element 850. The product group dimension 830 may have a product group key element 860. Since it is a measure 240, the order price measure 840 may have the product key element 750, the order date key element 850, the product group key element 860, and an order price element 870.

The second KPI recipe 800 may also be obtained through the use of the system 500 of FIG. 5 and/or the method 600 of FIG. 6. This may be facilitated via comparison with the second KPI recipe 800. For example, the data definition for the second KPI recipe 800 may be compared with the first KPI recipe 700. One or more dimensions, such as the order date dimension 820 and the product group dimension 830, may be added. One or more new measures, such as the order price measure 840, may be created by combining data from the first KPI ingredients 710, such as the product key element 750, with data from the other second KPI ingredients 810, such as the order date key element 850 and the product group key element 860, and adding the order price element 870. Such a data recipe modification technique may beneficially allow a data recipe to be modified at runtime, without changing structures that relied on previous definitions.

After the user 100 submits the information request 540 for the second KPI, the second KPI recipe 800 may be obtained by receiving and interrogating one or more data sources such as the data store 106 (or alternatively, one or more data sources different from those used to generate the first KPI recipe 700). The interrogation engine 510, the categorization engine 520, and/or the comparison engine 530 may operate with the aid of the data map 300, the semantic layer 400, and/or the heuristic algorithm 570 to provide a proposed model, or a proposed data recipe to obtain the second KPI, to the user 100.

The comparison engine 530 may operate by comparing data recipe ingredients 210 obtained from the categorization engine 520 with the first KPI ingredients 710 to obtain the pool of potential data recipe ingredients shown in FIG. 8. Then, the comparison engine 530 may modify the first KPI ingredients 710 applicable to the second KPI, and add new data recipe ingredients from the data recipe ingredients 210 obtained from the categorization engine 520, to obtain the second KPI ingredients 810.

As in the creation of the first KPI recipe 700, the proposed data recipe for the second KPI may be presented to the user 100, and the user 100 may be prompted to accept or reject the proposed data recipe. If accepted, the proposed data recipe provided to the user 100, used to satisfy the information request 540 for the second KPI by providing the requested information 580, and/or further processed, for example, by the heuristic algorithm 570 for further refinement as additional data is received.

The use of the heuristic algorithm 570 may beneficially avoid the need for the user 100 to manually map new data elements such as those of the first KPI ingredients 710 and the second KPI ingredients 810. Rather, the system 500 may iteratively present options to user 100 until the user 100 approves of a proposed data recipe.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for processing structured data, the method comprising:
   providing a library on a non-transitory storage medium, the library defining a plurality of reference data recipes, each reference data recipe comprising a data process configured to derive a quantitative data output corresponding to one or more data recipe ingredients;
   receiving, from a user, a request for quantitative data derived from data elements of one or more data sources, the request comprising semantic processing metadata;
   at a processor, defining data recipe ingredients available from the one or more data sources, wherein automatically identifying the available data recipe ingredients available from a data source comprises:
  parsing a schema of the data source to identify pre-defined data elements available within the data source, the data elements corresponding to quantitative data stored within the data source,
  determining attributes of respective data elements available within the data source by analyzing one or more of the schema of the data source and the quantitative data corresponding to the respective data elements stored within the data source,
  defining the data recipe ingredients available from the data source, each data recipe ingredient representing a respective one of the data elements stored within the data source, and comprising a location of the data element and the determined attributes of the data element, and
  applying pre-determined categorization rules to determined attributes of the data recipe ingredients to categorize each data recipe ingredient as one of a measurement data recipe ingredient and a dimension data recipe ingredient;
at the processor, selecting a reference data recipe from the library, wherein selecting the reference data recipe comprises:
  comparing the data recipe ingredients of the respective reference data recipes to the data recipe ingredients available within the one or more data sources defined within the library, and
  comparing data processes of the respective reference data recipes to the semantic processing metadata of the request;
at the processor, modifying the selected reference data recipe to create a new data recipe within the library, wherein modifying the selected reference data recipe comprises substituting a first data recipe ingredient of the selected reference data recipe with a specified one of the data recipe ingredients defined within the library; and
generating a data visualization comprising first quantitative data derived from the first data recipe ingredient and a second data recipe ingredient of the selected reference data recipe, wherein the first data recipe ingredient is classified as a measure and the second data recipe ingredient is classified as a dimension, and wherein generating the data visualization comprises displaying the first quantitative data as displacements on a scale of the data visualization corresponding to second quantitative data.

2. The method of claim 1, wherein the semantic processing metadata of the request comprises a key performance indicator that measures an aspect of organizational performance.

3. The method of claim 2, wherein the specified data recipe ingredient of each of the data recipe ingredients comprises a metric indicative of organizational performance, wherein the new data recipe comprises a mathematical formula that receives the data recipe ingredients as inputs and provides the data visualization as output.

4. The method of claim 1, wherein parsing the schema of the data source comprises parsing data elements stored within the data source into a NoSQL tree structure.

5. The method of claim 4, wherein parsing the data elements into the NoSQL tree structure comprises selecting a schema for the NoSQL tree structure based on a structure of the data source.

6. The method of claim 1, wherein the predetermined categorization rules comprise:
  a first rule to categorize date data types as dimension recipe ingredients,
  a second rule to categorize alpha-numeric data types as dimension recipe ingredients, and
  a third rule to categorize numeric data types as measure data recipe ingredients.

7. The method of claim 1, wherein categorizing the data recipe ingredients comprises inferring relationships among the measures and dimensions based on a structure of the one or more data sources.

8. The method of claim 1, wherein comparing the data recipe ingredients of the respective reference data recipes to the data recipe ingredients available within the one or more data sources comprises matching each of the data recipe ingredients available within the one or more data sources to a semantic layer.

9. The method of claim 8, wherein matching each of the data recipe ingredients to a semantic layer comprises:
  locating an identifying characteristic of each of the data recipe ingredients;
  locating, within the semantic layer, a phrase matching each identifying characteristic;
  and wherein the identifying characteristic is selected from the group consisting of:
    a name of the data recipe ingredient;
    a data type of the data recipe ingredient;
    a data size of the data recipe ingredient;
    a data structure of the data recipe ingredient;
    metadata of the data recipe ingredient; and
    a sample data set related to the data recipe ingredient.

10. The method of claim 8, wherein the semantic layer comprises a plurality of pairings, wherein each pairing comprises a phrase, a phrase mapping, and a confidence factor that indicates a likelihood that the data is related to the phrase, wherein matching each of the data recipe ingredients to a semantic layer comprises using the confidence factor of the pairing with a phrase that matches the data recipe ingredient.

11. The method of claim 1, wherein comparing the plurality of data recipe ingredients with the reference data recipe comprises using a data map comprising metadata that indicates how the reference data recipe is related to the one or more data sources.

12. The method of claim 11, further comprising, after creation of the new data recipe, updating the metadata to indicate how the new data recipe is related to the one or more data sources.

13. The method of claim 1, wherein comparing the plurality of data recipe ingredients with the reference data recipe comprises comparing an attribute of an element of each data recipe ingredient with a corresponding reference attribute of a reference data recipe ingredient of the reference data recipe, wherein the attribute is selected from the group consisting of: a name of the element; a data type of the element; a display name of the element; an alias of the element; a metadata tag associated with the element; an average size of data of the element; a level of uniformity of the element; a cleanliness level of the element; and an anticipated relationship between the element and other data.

14. The method of claim 1, wherein creating the new data recipe further comprises:
  creating a proposed new data recipe;
  at an input device, receiving, from the user, confirmation that the proposed new data recipe provides the requested quantitative data; and in response to receipt of the confirmation.

15. The method of claim 1, wherein creating the new data recipe further comprises:
   creating a proposed new data recipe;
   at an input device, receiving, from the user, indication of a modification to be made to the proposed new data recipe;
   in response to receipt of the indication, modifying the proposed new data recipe as indicated; and
   determining that the proposed new data recipe is the new data recipe.

16. The method of claim 1, further comprising:
   executing the new data recipe to obtain the requested information; and
   on a display screen, displaying the requested information for the user.

17. A computer program product for processing structured data stored in one or more data sources, comprising:
   a non-transitory storage medium; and
   computer program code, encoded on the medium, configured to cause at least one processor to perform the steps of:
      causing an input device to receive, from a user, a request for quantitative data derived from data elements of the one or more data sources, the request comprising semantic element metadata, and semantic processing metadata;
      interrogating the one or more data sources to discover a plurality of data types of data elements stored within the one or more data sources, wherein interrogating a data source comprises parsing a schema defining existing data elements managed by the data source, the existing data elements corresponding to quantitative data stored within the data source and comprising attributes pertaining to the quantitative data;
      comparing the semantic element metadata to the attributes of the data types to select data types for use as data recipe ingredients for the request;
      defining a plurality of data recipe ingredients for the request, each of the defined data recipe ingredients corresponding to a respective data element of a respective data source;
      applying pre-determined categorization rules to the data recipe ingredients to categorize each data recipe ingredient as one of a measurement data recipe ingredient and a dimension data recipe ingredient;
      selecting a reference data recipe from a data map, wherein selecting the reference data recipe comprises;
         comparing reference ingredients of the reference recipes to the defined data recipe ingredients, and
         comparing reference data processes by which quantitative data is derived from the reference recipe ingredients of the reference data recipes to the semantic processing metadata of the request;
      modifying the selected reference data recipe to create a new data recipe, wherein the modifying the selected reference data recipe comprises substituting one or more of the reference ingredients of the selected reference data recipe with respective data recipe ingredients defined for the request, the modifying comprising applying a data cleanliness comparison to one or more of the respective data recipe ingredients, wherein applying the data cleanliness comparison to a first data recipe ingredient comprises;
         accessing quantitative data corresponding to the first data recipe ingredient from a first data source,
         identifying errors in the accessed quantitative data, the identified errors comprising one or more of a null data relationships, malformed quantitative data, and data variations,
         determining a cleanliness metric for the first data recipe ingredient based on the identified errors, and
         comparing the determined cleanliness metric to a cleanliness metric associated with the corresponding one of the reference ingredients of the selected reference data recipe; and
      generating a data visualization comprising first quantitative data derived from the first data recipe ingredient and a second data recipe ingredient of the new data recipe, wherein the first data recipe ingredient is classified as a measure and the second data recipe ingredient is classified as a dimension, and wherein generating the data visualization comprises displaying the first quantitative data as displacements on a scale of the data visualization corresponding to the second quantitative data.

18. The computer program product of claim 17, wherein the computer program code configured to cause the at least one processor to perform the step of causing the input device to receive the request for information comprises computer program code configured to cause the at least one processor to receive a request for a key performance indicator that measures an aspect of organizational performance,
   wherein the computer program code configured to cause the at least one processor to perform the step of categorizing the data types to define the plurality of data recipe ingredients comprises computer program code configured to cause the at least one processor to categorize the data types to define a plurality of metrics indicative of organizational performance, and
   wherein the computer program code configured to cause the at least one processor to perform the step selected from the group consisting of modifying the reference data recipe to create the new data recipe and creating the new data recipe comprises computer program code configured to cause the at least one processor to perform a step selected from the group consisting of:
      modifying the reference data recipe to create a new mathematical formula that receives the data recipe ingredients as inputs and provides the requested information as output, and
      creating a new mathematical formula that receives the data recipe ingredients as inputs and provides the requested information as output, independently of the reference data recipe.

19. The computer program product of claim 17, wherein the computer program code configured to cause the at least one processor to perform the step of categorizing the data types comprises computer program code configured to cause the at least one processor to parse the data into a NoSQL tree structure,
   wherein the computer program code configured to cause the at least one processor to parse the data into a NoSQL tree structure comprises computer program code configured to cause the at least one processor to select a schema for the NoSQL tree structure based on a structure of the one or more data sources.

20. The computer program product of claim 17, wherein the computer program code configured to cause the at least one processor to perform the step of categorizing the data types comprises computer program code configured to cause the at least one processor to use a heuristic algorithm to identify measures and dimensions of the recipe ingredients,
   wherein the computer program code configured to cause the at least one processor to use the heuristic algorithm to identify measures and dimensions of the recipe ingredients comprises computer program code configured to cause the at least one processor to infer relationships among the measures and dimensions based on a structure of the one or more data sources.

21. The computer program product of claim 17, wherein the computer program code configured to cause the at least one processor to compare the plurality of data recipe ingredients with the reference data recipe comprises computer program code configured to cause the at least one processor to match each of the data recipe ingredients to a semantic layer,
   wherein the computer program code configured to cause the at least one processor to match each of the data recipe ingredients to a semantic layer comprises computer program code configured to cause the at least one processor to perform the steps of:
      locating an identifying characteristic of each of the data recipe ingredients; and
      locating, within the semantic layer, a phrase matching each identifying characteristic,
      wherein the identifying characteristic is selected from the group consisting of: a name of the data recipe ingredient; a data type of the data recipe ingredient; a data size of the data recipe ingredient; a data structure of the data recipe ingredient; metadata of the data recipe ingredient; and a sample data set related to the data recipe ingredient.

22. The computer program product of claim 21, wherein the semantic layer comprises a plurality of pairings, wherein each pairing comprises a phrase, a phrase mapping, and a confidence factor that indicates a likelihood that the data is related to the phrase,
   wherein the computer program code configured to cause the at least one processor to match each of the data recipe ingredients to a semantic layer comprises computer program code configured to cause the at least one processor to use the confidence factor of the pairing with a phrase that matches the data recipe ingredient.

23. The computer program product of claim 17, wherein the computer program code configured to cause the at least one processor to compare the plurality of data recipe ingredients with the reference data recipe comprises computer program code configured to cause the at least one processor to use a data map comprising metadata that indicates how the reference data recipe is related to the one or more data sources,
   wherein the computer program code is further configured to cause the at least one processor to, after creation of the new data recipe, update the metadata to indicate how the new data recipe is related to the one or more data sources.

24. The computer program product of claim 17, wherein the computer program code configured to cause the at least one processor to compare the plurality of data recipe ingredients with the reference data recipe comprises computer program code configured to cause the at least one processor to compare an attribute of an element of each data recipe ingredient with a corresponding reference attribute of a reference data recipe ingredient of the reference data recipe, and
   wherein the attribute is selected from the group consisting of: a name of the element; a data type of the element; a display name of the element; an alias of the element; a metadata tag associated with the element; an average size of data of the element; a level of uniformity of the element; a cleanliness level of the element; and an anticipated relationship between the element and other data.

25. A system for processing structured data stored in one or more data sources, the system comprising:
   an input device, configured to receive a request for information from a user; and
   a processor, communicatively coupled to the input device, configured to:
      interrogate one or more data sources to discover a plurality of data types of data stored within the one or more data sources, wherein interrogating a data source comprises parsing an existing schema of the data source, the schema defining data types for existing quantitative data stored within the data source;
      define a plurality of data recipe ingredients based on semantic metadata included in the request, each data recipe ingredient corresponding to a respective one of the data types;
      categorize each data recipe ingredient as one of a measure and a dimension based on pre-determined categorization rules;
      compare the plurality of data recipe ingredients with a reference data recipe by use of semantic metadata included in the request and a reference processing applied by the reference data recipe;
      modify the reference data recipe to create a new data recipe that provides the requested information based on results of the comparison, the modifying comprising replacing a reference ingredient defining quantitative data for the reference data recipe with the data recipe ingredients, the replacing comprising applying one or more of a data uniformity rule and a data cleanliness rule to a first one of the data recipe ingredients, comprising:
         accessing quantitative data corresponding to the first data recipe ingredient from a data source,
         deriving one or more of a data uniformity metric and a data cleanliness metric from the quantitative data, wherein:
            deriving the data uniformity metric comprises calculating a proportion of distinct data points within the quantitative data to a total number of data points within the quantitative data, and
            deriving the data cleanliness metric comprises parsing the quantitative data to identify errors in the quantitative data, the parsing comprising one or more of detecting null relationship data, identifying malformed data, and determining a prevalence of variations of a standard data point within the quantitative data, and
         comparing one or more of the data uniformity metric and the data cleanliness metric derived from the quantitative data of the first data recipe ingredient to a corresponding attribute of the reference ingredient; and
      generate a data visualization comprising first quantitative data derived from a first data recipe ingredient and a second data recipe ingredient of the new data recipe, wherein the first data recipe ingredient is classified as a measure and the second data recipe ingredient is classified as a dimension, and wherein generating the data visualization comprises displaying the first quantitative data as displacements on a scale per QS of the data visualization corresponding to the second quantitative data.

26. The system of claim 25, wherein the requested information comprises a key performance indicator that measures an aspect of organizational performance and each of the data recipe ingredients comprises a metric indicative of organizational performance, and wherein the processor is further configured to perform the step selected form the group consisting of modifying the reference data recipe to create the new data recipe, and creating the new data recipe independently of the reference data recipe by creating a mathematical formula that receives the data recipe ingredients as inputs and provides the requested information as output.

27. The system of claim 25, wherein the processor is further configured to categorize the data types by parsing the data into a NoSQL tree structure, and wherein the processor is further configured to parse the data into the NoSQL tree structure by selecting a schema for the NoSQL tree structure based on a structure of the one or more data sources.

28. The system of claim 25, wherein the processor is further configured to categorize the data types by using a heuristic algorithm to identify measures and dimensions of the recipe ingredients, and wherein the processor is further configured to use the heuristic algorithm by inferring relationships among the measures and dimensions based on a structure of the one or more data sources.

29. The system of claim 25, wherein the processor is further configured to compare the plurality of data recipe ingredients with the reference data recipe by matching each of the data recipe ingredients to a semantic layer;

and wherein the processor is further configured to match each of the data recipe ingredients to a semantic layer by:

locating an identifying characteristic of each of the data recipe ingredients; and locating, within the semantic layer, a phrase matching each identifying characteristic, wherein the identifying characteristic is selected from the group consisting of: a name of the data recipe ingredient; a data type of the data recipe ingredient; a data size of the data recipe ingredient; a data structure of the data recipe ingredient; metadata of the data recipe ingredient; and a sample data set related to the data recipe ingredient.

30. The system of claim 29, wherein the semantic layer comprises a plurality of pairings, wherein each pairing comprises a phrase, a phrase mapping, and a confidence factor that indicates a likelihood that the data is related to the phrase, wherein the processor is further configured to match each of the data recipe ingredients to a semantic layer by using the confidence factor of the pairing with a phrase that matches the data recipe ingredient.

31. The system of claim 25, wherein the processor is further configured to compare the plurality of data recipe ingredients with the reference data recipe by using a data map comprising metadata that indicates how the reference data recipe is related to the one or more data sources, and wherein the processor is further configured to, after creation of the new data recipe, update the metadata to indicate how the new data recipe is related to the one or more data sources.

32. The system of claim 25, wherein the processor is further configured to compare the plurality of data recipe ingredients with the reference data recipe by comparing an attribute of an element of each data recipe ingredient with a corresponding reference attribute of a reference data recipe ingredient of the reference data recipe, wherein the attribute is selected from the group consisting of: a name of the element; a data type of the element; a display name of the element; an alias of the element; a metadata tag associated with the element; an average size of data of the element; a level of uniformity of the element; a cleanliness level of the element; and an anticipated relationship between the element and other data.

* * * * *